UNITED STATES PATENT OFFICE.

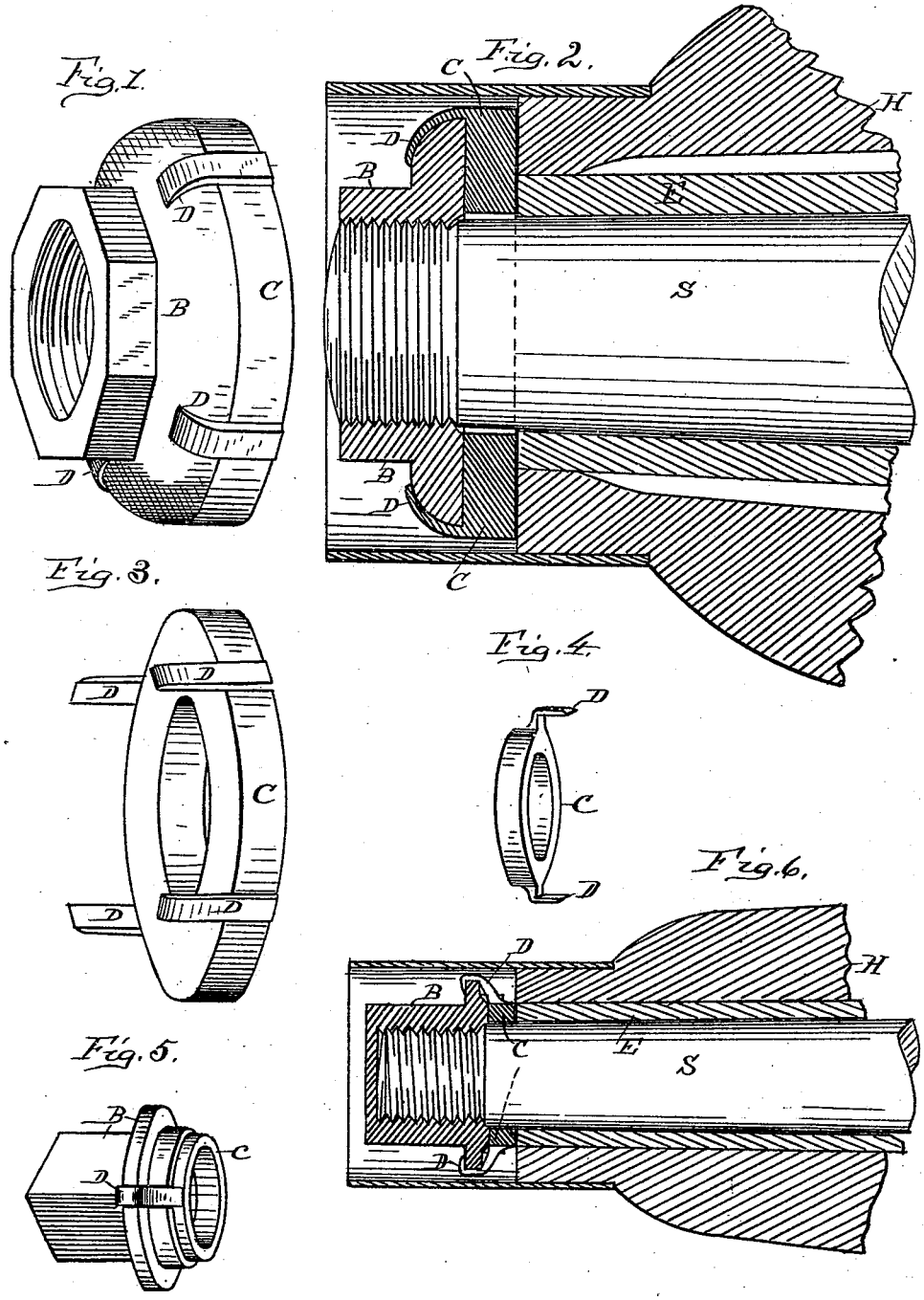

ROBERT W. McCLELLAND, OF VALLEY CENTRE, KANSAS, ASSIGNOR OF ONE-HALF TO JOHN L. BOEHME, OF SAME PLACE.

VEHICLE SPINDLE-NUT.

SPECIFICATION forming part of Letters Patent No. 515,089, dated February 20, 1894.

Application filed June 10, 1893. Serial No. 477,184. (No model.)

*To all whom it may concern:*

Be it known that I, ROBERT W. MCCLELLAND, a citizen of the United States of America, residing at Valley Centre, in the county of Sedgwick and State of Kansas, have invented certain new and useful Improvements in Vehicle Spindle-Nuts, of which the following is a specification, reference being had therein to the accompanying drawings and the letters of reference thereon, forming a part of this specification, in which—

Figure 1 is a perspective view of a wagon spindle nut, having the extension clipped thereto; Fig. 2, a cross-sectional view of the same, also of a portion of a wagon hub, and a side view of a portion of the wagon spindle. Figs. 3 and 4 are perspective views of the extension parts of the nuts; Fig. 5, a perspective view of a carriage spindle nut, having the extension clipped thereto; Fig. 6, a cross-sectional view of the same, also of a portion of a carriage hub, and a side view of a portion of the carriage spindle.

This invention relates to certain means, whereby the hub-box of a wagon or carriage wheel is held on its spindle to avoid undue lateral movement of the said box on the spindle, in vehicles where said box and spindle have become worn or under other circumstances, and consists of an extension part, made in form as a washer or collar which is fixed to the spindle nut and extends beyond the nut, and engages the hub box, which improvements are fully set forth and explained in the following specification and pointed out in the claim.

The object of this invention is to provide the nuts of a vehicle with the extension parts, fixed to the nuts, so that the removal of the nuts from their spindles will likewise remove and hold the extension.

Referring to the drawings B is the vehicle spindle nut. C is the extension part thereof, which is made in form as a washer or collar, and is provided with side extending bendable arms D. In attaching the extension part to the nut, the part C is brought to bear with its side against the engaging face of the nut, and with the arms D overreaching the nut flange. When such position is had the arms D are bent down about the nut flange, thus clamping the said flange and thereby holding the extension part fixed to the nut.

H represents the wheel hub and E the box thereof. S represents the spindle placed in said box. The nut is placed on the screw-threaded end of the spindle which brings the extension part C of the nut to engage the end of said box, and thus hold the box a greater distance from the nut, than would be the result by the removal of the said extension part, and therefore said part C holds the box E farther on the spindle S and thereby avoids undue lateral movement of said box on the spindle.

Having thus described my invention, what I claim as new and useful, and desire to secure by Letters Patent, is as follows:

In a vehicle the combination with the spindle, the hub-box and spindle nut, of the washer or collar C provided with the bendable arms D, and fixedly secured to the nut by means of said bendable arms, substantially as and for the purpose set forth.

ROBERT W. McCLELLAND.

Witnesses:
JOHN L. BOEHME,
WM. J. HUTCHINS.